Patented June 13, 1939

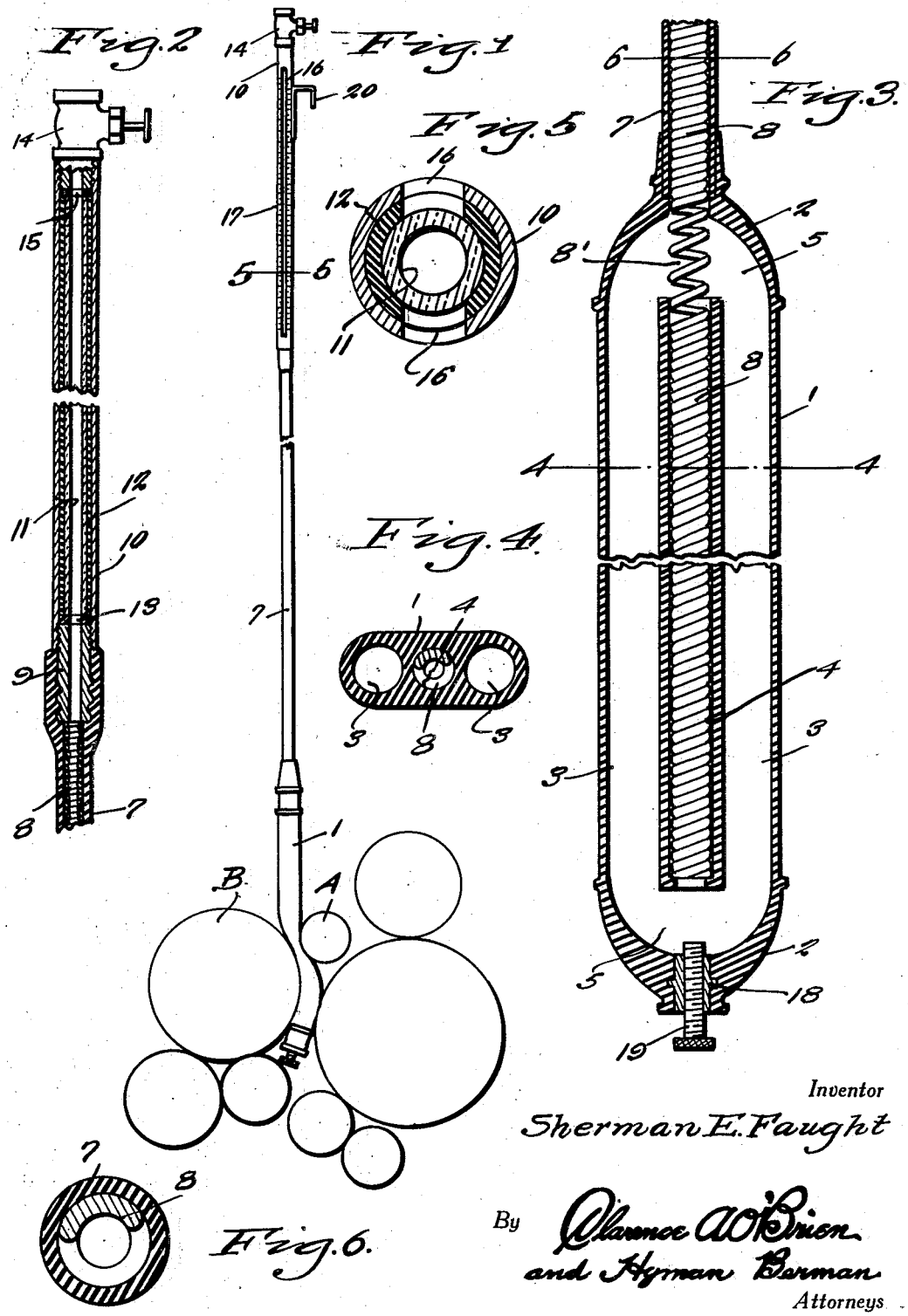

2,162,425

UNITED STATES PATENT OFFICE 2,162,425

SETTING GAUGE FOR RESILIENT ROLLERS OF PRINTING PRESSES

Sherman E. Faught, New Orleans, La.

Application March 30, 1938, Serial No. 199,045

4 Claims. (Cl. 33—182)

This invention relates to a setting gauge for rubber and composition rollers of printing presses, the general object of the invention being to provide a member of resilient material and having a plurality of communicating conduits therein, with means for connecting the member to a gauge device so that when the member is placed between the rollers it will be compressed and some of the liquid therein will be forced into the gauge which will indicate the distance between the rollers, thus enabling the rollers to be accurately set.

Another object of the invention is to provide means in one of the conduits and in the means which connect the member with the gauge for preventing compression thereof so as to maintain a passage for the liquid to the gauge.

Another object of the invention is to provide means for adjusting the liquid at the zero point of the scale whenever necessary.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a diagrammatic elevational view showing the device in use with the rollers of a printing press.

Figure 2 is a longitudinal sectional view through the gauge part of the device.

Figure 3 is a longitudinal sectional view through the resilient member.

Figure 4 is a section on the line 4—4 of Figure 3.

Figure 5 is a section on the line 5—5 of Figure 1.

Figure 6 is a section on the line 6—6 of Figure 3.

In this drawing, the numeral 1 indicates an elongated member formed of rubber or the like and which is provided with the reduced ends 2 and which is formed with a pair of outer conduits or passages 3 and a central passage or conduit 4. These passages extend lengthwise through the member and are in communication with each other in the end parts 2 as shown at 5. A flexible tube 7 is connected with the central portion of one end 2 of the member 1 and is in communication with the space 5 of said end and a stiff coiled spring 8 passes through the center conduit or passage 4, through the space 5 of the upper end part 2 and through the tube 7. This spring may have those portions which pass through the conduit 4 and the tube 7 tightly coiled but that part which passes through the space 5 has its coils spaced apart as shown at 8' in Figure 3, so that the liquid placed in the device can pass through the part 8' of the spring into the bore formed by the spring, said spring acting to prevent compression of the walls of the center conduit or passage 4 and of the tube 7 and that part of the spring in the tube 7 prevents kinks forming in the tube 7 and also acts to straighten the tube after it has been folded or looped in placing the device in a small compass such as in carrying the device from one point to another and placing the device in a box or the like.

A coupling 9 is placed in the outer end of the tube 7 and an elongated casing 10 of metal or the like has one end threaded to the coupling, as shown in Figure 2, and said casing 10 forms a protective housing for a transparent tube 11, a sleeve 12 of rubber or the like being placed between the glass tube and the casing 10. A gasket 13 is placed between the lower ends of the glass tube 11 and the sleeve 12 and the upper end of the coupling 9. A valve 14 has a nipple at one end which is threaded in the upper end of the casing 10 and a gasket 15 is located between the lower end of the threaded part of the valve and the upper end of the glass tube and the sleeve. Of course, the coupling 9 and the transparent tube 11 and their bores forming continuations of the bore of the spring in the tube 7 so that liquid from the member 1 can enter the transparent tube and the casing 10 and sleeve 12 are provided with the elongated slots 16 for enabling the level of liquid in the transparent tube 11 to be observed and the casing adjacent the slots is provided with the usual scale 17 for reading said level.

A bushing 18 is molded in the lower end part 2 of the member 1 and a screw 19 is threaded in the bushing and acts as adjusting means for adjusting the level of liquid in the device so that the level will be at zero on the scale at the beginning of the setting operation.

When it is desired to adjust the rubber or composition roller A relative to a roller B, for instance, of a press, a pair of the devices is placed between the rollers, adjacent the ends of said rollers, with an intermediate part of each member 1 placed between the two rollers as shown in Figure 1 and then as the roller A is moved toward the roller B said member 1 will be compressed and some of the liquid in the conduits or passages 3 will be forced upwardly into the upper end of the member into the tube 7 and some of the liquid will be forced downwardly through the part 5 of the lower end 2 and then upwardly through the center conduit 4 so this liquid will pass to the upper end of the device and then through the tube 7 and the reading of the level of liquid in the transparent tube 11 on the scale 17 will actually indicate the distance between the rollers A and B so that these rollers can be properly set to the desired degree. By having both ends of the conduits 3 in communication with the center conduit and therefore with the tube 7 leading to the gauge part of the device none of the liquid will be trapped in the device by the pressure of the rollers and as before stated the spring will prevent compression of the center conduit so that the liquid has free movement through the said center conduit. When the device is being used the valve 14 is opened to permit the escape of air and a hook-shaped bracket 20 is connected to a part of the casing 10 so that the gauge can be supported on a part of the frame of the press while the device is being used.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described the invention, what is claimed as new is:

1. A roller setting gauge comprising an elongated member of compressible material adapted to be placed between a pair of rollers and containing liquid, said member having a number of conduits therein in communication with each other at the ends of the member, a tube connected with one end of the member and in communication with the conduits therein, a sight gauge connected with the outer end of the tube and means in one of the conduits for preventing compression of said one conduit.

2. A roller setting gauge comprising an elongated member of compressible material adapted to be placed between a pair of rollers and containing liquid, said member having a number of conduits therein in communication with each other at the ends of the member, a tube connected with one end of the member and in communication with the conduits therein, a sight gauge connected with the outer end of the tube, means in one of the conduits for preventing compression of said one conduit, and means carried by the member and in communication with a part of the liquid containing space thereof for adjusting the level of liquid with respect to the gauge.

3. A setting gauge for rollers of a printing press comprising an elongated member of resilient material and having passages therein communicating with each other at the ends of the member, said member containing liquid, means in one of the passages for preventing compression of said one passage, a sight gauge, a conduit for connecting one end of the resilient member to said gauge, a valve carried by the gauge for the escape of air therefrom, and a screw threaded in the other end of the resilient member and extending into the liquid receiving space of the member for adjusting the level of liquid.

4. A roller setting gauge for a printing press comprising an elongated resilient member containing liquid and having a pair of longitudinally extending outer passages therein and a central longitudinal extending passage, said passages being in communication with each other at the ends of the device, a sight gauge, a conduit for connecting one end of the resilient member with one end of the sight gauge, a coiled spring passing through the center passage and into the conduit for preventing compression of the center passage and said conduit.

SHERMAN E. FAUGHT.